Figure 1:
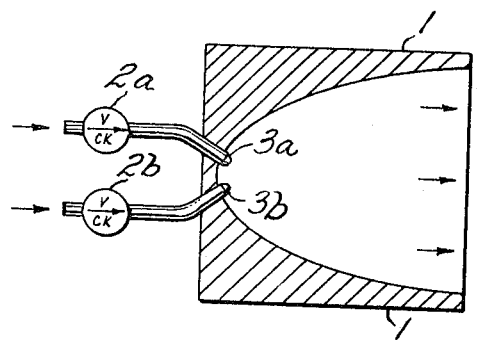
Figure 2:
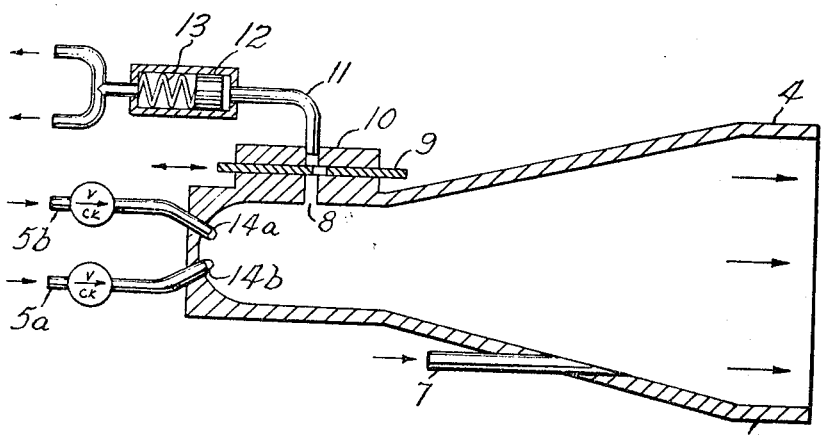

INVENTORS
Hans Walter
Bjørnar Walter

United States Patent Office 3,321,920
Patented May 30, 1967

3,321,920
METHOD OF PRODUCING PROPULSIVE FORCES BY INTERMITTENT EXPLOSIONS USING GEM-POLYNITRO AND HYDRAZINE COMPOUNDS
Hans Walter and Benno Walter, Huntsville, Ala., assignors to Brown Engineering Company, Inc., Huntsville, Ala., a corporation of Alabama
Filed June 29, 1964, Ser. No. 378,736
2 Claims. (Cl. 60—211)

The present invention relates to special propellants for rocket motors and more particularly to some kind of liquid or vaporous bi-propellants that detonate spontaneously upon contact with each other.

Rocket motors are usually powered by ergolic as well as hypergolic bi-propellants. The former group comprises the combination of a liquid fuel like kerosene, alcohol or hydrogen with oxygen or nitric acid. The ignition of these propellants is performed by spark plugs, glow coils or pyrotechnical igniters. If the mixing ratio of the two bi-propellants is not efficiently controlled, motor blasts will occur when re-igniting. This risk may be prevented by applying hypergolic bi-propellants, which ignite spontaneously when contacting each other, thus preventing safely any detonations. Hypergolic oxidizers are nitric acid, nitrogen dioxide, and hydrogen peroxide.

Now we have found that using special oxidizers in combination with strongly reducing fuels, reacting with spontaneous and immediate detonations, offers a new and advantageous method for producing repulsive forces in rocket motors. In this case the thrust is produced by travelling shock waves.

One of the most important objects of the present invention is to provide a high efficiency propulsion method, in which thrust chambers without convergent-divergent nozzles apply. It is known that the most vulnerable part of all chemical rocket motors is the nozzle throat with the erosion limiting the time of powered flight to some minutes and less. This problem is completely solved by the above said thrust chambers without nozzles, which allow greatly prolonged flight times.

It is another object of the present invention to provide a method for producing repulsive forces, by which any risk of the occurrence of motor blasts is prevented.

It is still another object of the present invention to provide a method in which no igniters whatever are needed.

It is another object of the present invention to provide fuel-oxidizer components, hencetoforth called explophorics, which detonate immediately and spontaneously upon contact to each other.

For better understanding of the nature and object of the invention, reference is made to the following description and drawings.

Referring to FIG. A, 1 shows an explophoric thrust chamber in the form of a paraboloid. An oxidizing and a reducing explophoric, contained in tank I and tank II respectively (not shown), are introduced into 1 via check valves 2a and 2b respectively and slightly constricted nozzles 3a and 3b respectively. The two explophorics, when introduced, meet at about the focal point, whereby a downstream travelling detonation shock wave is generated, thus producing thrust. A rarefaction wave reflected back will generate a pressure decrease. This will actuate 2a and 2b and suck in explophorics, liquid and/or gaseous ones, from tanks I and II. The subsequent detonation with its strong pressure rise will close again the check valves 2a and 2b, thus terminating the detonation cycle. The frequency of intermittent detonations may be furthermore controlled by varying the form of motor 1, oscillating with organ pipe quarter waves. In this way the pulsating detonations are controlled without the co-use of mechanically actuated valves.

Instead of the parabolic thrust chamber shown in FIG. A, a simple cylinder or a frustrum of a cone may be used, which is closed at one side and provide with auxiliaries 2 and 3 as shown in FIG. A.

FIGURE B illustrates a jet motor 4 provided downstream with a divergent exit duct. Explophorics from tanks I and II (not shown) are introduced via check valves 5a and 5b respectively and spray nozzles 14a and 14b. The detonation waves thus generated travel with supersonic speed downstream. The devices 8 through 13 are to pressurize tanks I and II (not shown) in a conventional manner, however, in pulsewise rhythms. When the said detonation shock waves pass by slot 8 in the wall of the chamber, a pressure pulse is sent through an opening in the laterally adjustable shutter 9 and subsequently through the flat dome 10 and pipe 11. Following this, the pressure pulses actuate the heat-impermeable piston 12, which is positioned by spring 13. Piston 12 generates pressure pulses of air or any fluid, which pressurizes both tanks containing the explophorics with the more or less delayed pressure pulses inside of 4. The divergent duct may be provided with inlets 7 to induct ambient air in order to perform supersonic aftercombustion of unburnt constituents of the explosion gases. Additional cheap fuel, like kerosene or low boiling gasoline, may likewise be passed into the divergent part, where it will undergo supersonic aftercombustion with ambient air. By this way, the expenses for propellants may be greatly decreased.

It will be noted that the new motors do not show any convergent-divergent De Laval nozzle. This does not exclude a construction of the walls of the new thrust chambers with slight constrictions for the purpose of modifying the flow of the shock waves. However, any choking must be prevented.

Now the present invention provides special oxidizers which offer explophoric properties, that is, properties that cause a spontaneous detonation to be produced when the oxidizer comes in contact with reducing fuel. Explophoric oxidizers were found to be gem-polynitro organic compounds in which at least two nitro groups are linked to one carbon atom, like tetranitromethane, nitroform, beta trinitroethanol, hexanitroethane or pernitro butane, preferably dissolved in nitric acid, tetranitroethane potassium in solution and fluoro trinitromethane.

Another type of explophoric oxidizer involves compounds of fluorine with chlorine, viz., chloro trifluoride; with oxygen like difluoro oxide or with nitrogen, like nitrogen trifluoride, tetrafluoro hydrazine, difluoro amine and fluorinated organic amines.

The third type of explophoric oxdizer comprises azido compounds like sodium azide, ammonium azide or beta azido ethanol, which are explophoric not only with reducing fuels but likewise with acids.

The above listed explophoric oxidizers may be applied either as such, or in form of mixtures respectively in solutions with each other or with non-explophoric oxidizers like nitric acid or hydrogen peroxide.

Reducing fuels reacting explophorically with the aforesaid oxidizers are sodium-potassium alloys, hydrides of boron and of aluminum, alkyls of magnesium, of zinc and of aluminum, moreover hydrazine, mono- and unsymmetrical di-methyl hydrazine, diamino guanidine, carbodihydrazide, triamino guanidine, formic acid, and acrylic acid.

Both types of explophorics may be applied either as such or in form of mixtures of oxidizing explophorics or of reducing ones. They may likewise be applied as solutions. This provides the use, not only of liquid explophorics, but likewise of solid and gaseous ones. These several combinations furnish a simple means to control the induction- or detonation-delay within larger ranges. This in turn represents a control of the number of intermittent detonations per unit time and, hence, a control of the thrust.

A further control is furnished by varying the ratio of oxidizing and reducing explophorics. For instance, tetranitromethane and hydrazine offer prompt detonation in any ratio while liquid sodium-potassium alloy and beta trinitroethanol offer various detonation frequencies, depending largely on the mutual ratio as well as on the particle size.

By way of example with the explophoric combination of tetranitromethane-hydrazine in the ratio of 60.5% to 39.5% weight respectively, a specific impulse is achieved as high as 306 sec. It should furthermore be emphasized, that external cooling of the new motors by convection and radiation can be performed more easily and efficiently than in conventional rocket motors.

Pulse jet propulsion, viz., the German V–1, likewise produced thrust by intermittent detonation; however, they apply only for the air breathing operation. Moreover, the number of explosion cycles is unduly reduced, since the periodic refilling of the pulse jet with ambient air requires a considerable time delay. So, they cannot compete with the conventional rocket motors and apply for very low altitudes and low speeds of flight only. Moreover, they do not apply, like any air breathing engine, for space missions. Contrary to this the time delay in explophoric propulsion is generally negligible, since the explophorics introduced into the motor are used in condensed form, viz., liquid or solutions. Moreover the isentropic stagnation pressure in explophoric detonations is by far higher than in any conventional rocket motor. Consequently the thrust as well as the specific impulse is high. Again the operation of the new motor is considerably safer, since any excessive detonation wave can freely discharge to outside without any risk of a motor blast.

Furthermore engines, powered by gas detonations, are to be initiated by spark plugs, pilot flames or similar means, whereby a track of variable length of a slow combustion precedes the formation of the steady detonation wave, thus giving rise to serious off-design operations. This, again, differs fundamentally from explophoric operation, which involves instantaneously fully established detonations. There is likewise a fundamental difference in comparison to conventional high explosives, which require the co-operation of a primer or a booster in order to develop fully established detonations.

We claim:

1. A method for producing thrust by detonation waves in an explophoric thrust chamber in the form of a divergent exit duct, which comprises injecting intermittently a gem-polynitro oxidizer and a hydrazinic fuel from separate sources.

2. A method for producing thrust by detonation waves in an explophoric thrust chamber in the form of a paraboloid, which comprises injecting intermittently a gem-polynitro oxidizer and a hydrazinic fuel from separate sources.

References Cited
UNITED STATES PATENTS

| | | | |
|---|---|---|---|
| 2,930,684 | 3/1960 | Kanarek | 149—1 |
| 3,088,406 | 3/1963 | Horner | 60—35.6 X |
| 3,095,693 | 7/1963 | Wamser | 60—35.4 |
| 3,100,963 | 8/1963 | Michel | 60—35.6 |
| 3,132,060 | 5/1964 | Beegle et al. | 149—89 X |
| 3,146,139 | 8/1964 | Collins et al. | 60—35.4 |
| 3,170,282 | 2/1965 | Kirshenbaum et al. | 149—1 X |
| 3,213,609 | 10/1965 | Johnston et al. | 149—89 X |
| 3,213,610 | 10/1965 | Grigger et al. | 149—1 X |

BENJAMIN R. PADGETT, *Primary Examiner.*